Figure 2:
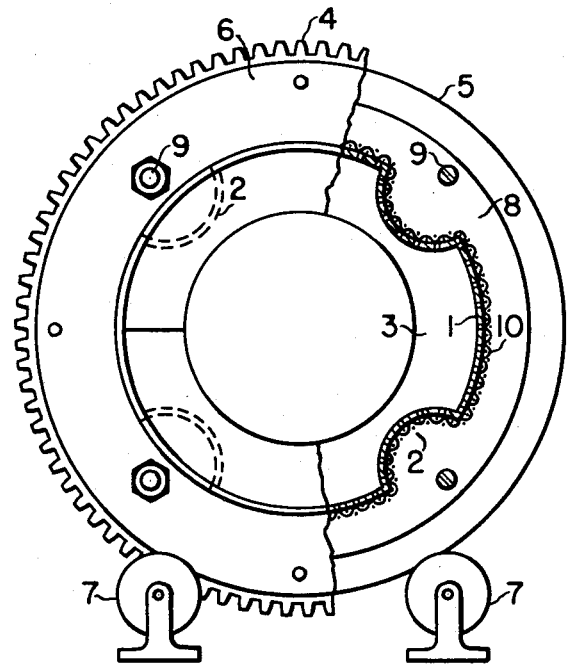

June 19, 1956

E. C. LATHROP 2,750,855

DEWATERING OF PULP

Filed Dec. 20, 1951

INVENTOR.

ELBERT C. LATHROP.

United States Patent Office
2,750,855
Patented June 19, 1956

2,750,855

DEWATERING OF PULP

Elbert C. Lathrop, Peoria, Ill., assignor to the United States of America as represented by the Secretary of Agriculture Application December 20, 1951, Serial No. 262,641

3 Claims. (Cl. 92—20)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the dewatering of aqueous fluid pulps. It relates particularly to the separation of water or water solutions from pithy pulps, and provides a method for accomplishing partial dewatering together with a novel apparatus for doing so.

Fluid pulps containing pith particles as an essential component are produced in the separation of fiber from pithy materials in the pulp and paper industry. One such fraction is produced in the method for fractionating pithy fiber materials described in application Ser. No. 227,586, and the present invention accomplishes dewatering of such fractions in an efficient and continuous manner. However, although applying particularly to pithy pulps, my invention is not so limited. The principle which will be described in detail in the following paragraphs, may be applied to any aqueous pulp that is characterized by a general cohesiveness when partially dewatered and a tendency to plug up the interstices of the fine screens used in dewatering. Examples of such pulps are fruit and vegetable pulps, ground wood, sawdust and wood flour pulps, mineral pulps, such as milled ore, the clays, and the like.

When fluid pulps are dewatered by the general principle of screening away the liquid, many tend to stick to the screen and reduce the efficiency of the operation. Some are so troublesome as to prevent satisfactory continuous operation for any substantial period of time. In the past, methods of preventing the clogging of screens in this operation have been various. For example, scrapers have been employed to remove adhering material from the rotating screen, or the screens have been subjected to water washes or air blasts to free them. Moreover, the screens have been vibrated more or less vigorously to shake loose the adhering material.

These prior methods have frequently been unsatisfactory. Scraping is mechanically difficult, particularly if the screen is fitted with a screw conveyor for urging the pulp through the device. Water washing frequently defeats the purpose of dewatering, for it tends to create a mud in the apparatus and adds considerably to the expense of pulp separation and waste water disposal. Vibration of the screen is not only difficult mechanically, but requires costly installation and maintenance.

I have determined that certain pulps, particularly the pithy pulp obtained from the process previously mentioned, is cohesive when partially dewatered and, under proper operating conditions, tends to emerge from a rotating screen type of dewaterer in the form of accretions or balls. These balls are formed by a build-up of layers upon nuclei which roll and tumble down the rising side of the rotating screen. Because of their physical structures these masses contain somewhat less water than is present in the surrounding zones. They grow by picking up relatively wet pulp clinging to the sides of the screen, thus tending to free the screen. However, the freeing action associated with these tumbling masses is usually not sufficient to maintain the screen free enough to permit continuous operation, and the screen tends eventually to plug.

According to the invention, the formation of these balls or accreted masses is stimulated by employing rotating screens of such a form that the rolling action is prolonged. Instead of rising for the relatively short distance possible in the common foraminous cylindrical-type screen, in my process masses of pulp rise considerably above such point and are then induced to travel back toward the bottom of the screen at a somewhat accelerated rate. This cycle of induced rising accomplishes an increased increment of dewatering, so that when the masses travel downward they contain less water than the pulp over which they travel, thus inducing the formation of accreted masses or balls. These balls pass through succeeding cycles of rising and accelerated downward travel until they are discharged. They may or may not become broken during the process. When broken, the fragments become nuclei for new accretions formed in succeeding cycles of rising and falling.

I accomplish greatly increased ball formation and consequent freeing of the screen by employing a rotating screen, preferably generally cylindrical in shape, the inner surface of which, however, is provided with rolls or ridges parallel to the axis of rotation. These rolls or ridges, which may take a variety of specific shapes, provide a series of spaced shelf-like receding ledges or rolls which carry the masses up the rising side of the screen and generally induce ball accretion or formation. This action frees the screen from adhering layers of pulp and permits continuous and efficient dewatering.

It is important to the success of my invention that the rotating screen is so constructed as to induce a rolling motion. Merely raising and dropping the pulp masses will not accomplish the self-cleaning action nor will it induce ball-formation. Thus, the shelf-like ledges of my novel apparatus are not substantially perpendicular to the cylinder, but rather their leading edges recede, sloping considerably away from the radius of the cylinder, toward the cylinder wall.

The accompanying drawing illustrates one embodiment of the invention particularly adapted for dewatering aqueous bagasse pulps. In the drawing, Figure 1 represents a lateral view of a dewatering screen provided with rolls or ridges which effect the stimulated ball formation and improved dewatering according to my invention.

Figure 2 represents the screen viewed from the outlet end with a portion broken away to show the structure of the screen, rolls, and spiral conveyor flights.

Figure 1:
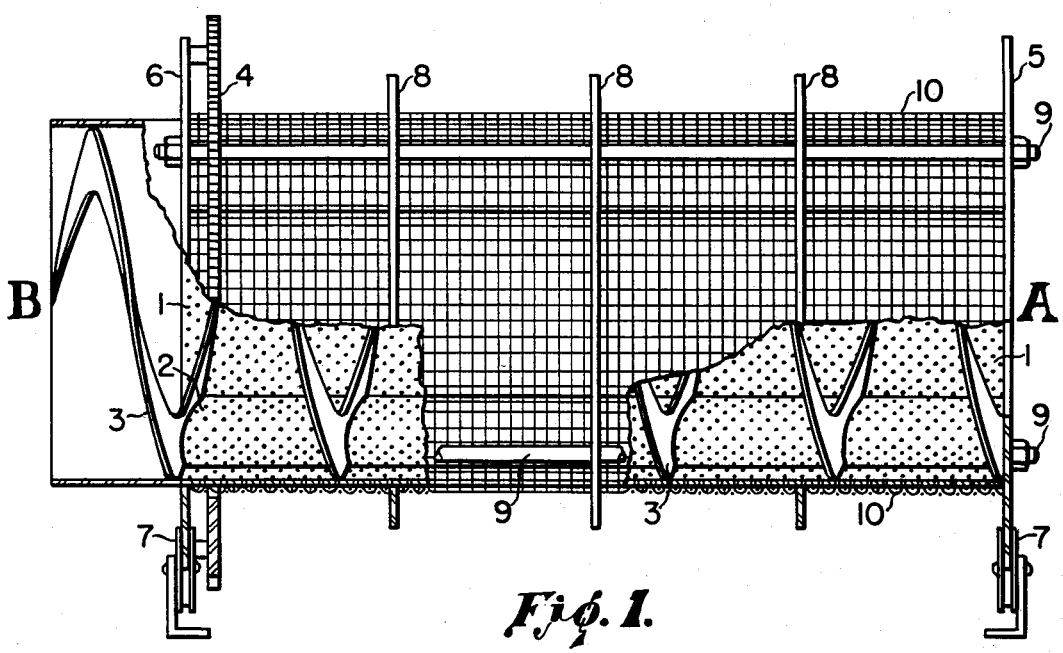

Referring to Figure 1, the outer shell of the screen 1 is provided with spaced furrows or flutings 2 which form the inner rolls or ridges. It is provided with a spiral screw 3 for urging the pith forward through the screen. The device is fitted at one end with a ring sprocket 4 for rotation. At the inlet end A the aqueous suspension of pith is fed while the screen is rotating at a relatively slow speed, say 3 to 10 R. P. M. The axis of the screen may be inclined slightly from the horizontal, the inlet end being higher than the outlet B. The screen unit is provided at each end with a surrounding annular ring 5 and 6 which act as bearing surfaces. These rings rest in guide rollers 7 where they ride when the screen is rotating. Intermediate annular rings 8 are spaced along the length of the device, the assembled parts being secured by tie rods 9. A coarse wire mesh 10 follows the contour of screen 1 to lend it strength and support.

The major portion of the water, in the case of an aqueous pulp of low consistency, passes out through the screen near the inlet. The rotating action of the screen and contained spiral conveyor urges the wet pulp forward toward the outlet end. As the masses of wet pulp are rotated, they are carried up the rising side of the screen until they arrive at a point where the ridges permit them to travel down with an accelerated rolling motion. The masses thus pass through repeated cycles of rising and rolling as they move toward the outlet. This rising and rolling action increases the dewatering action of the screen. It induces the formation of balls of partially dewatered pith which roll along the channel formed by the spiral conveyor flights, picking up wet pith that clings to the side of the screen as they progress.

At the outlet end of the screen the partially dewatered pith is discharged in the form of wet, ball-like accretions which may subsequently be further dewatered by rolling or pressing, according to known methods.

In operation, the aqueous pulp suspension is fed to the inlet end, and much of the liquid is separated in the first few seconds, leaving a wet, mud-like pulp. This pulp would normally move along the screen with a sort of sliding motion, but in our invention is carried up the rising side of the screen by the shelf-like effect of the ridges. As the ridges continue to rise, water separates from the wet pulp, and the pulp tends to form into a mass which eventually tumbles back toward the bottom of the screen. This action quickly results in the formation of accreted balls which contain less water than the unaccreted pulp lying upon the screen. These balls pick up the unaccreted pulp and increase in size somewhat like a snowball grows as it is rolled.

In some instances, particularly where the pulp is unusually sticky and clings to the screen, ball formation may be facilitated by providing a very fine spray or fog to the outside of the screen, preferably intermittently. This decreases the relative adhesiveness of the unaccreted pulp for the screen compared with its adhesiveness for the tumbling masses of partially dewatered pulp and increases the cleaning action of the tumbling masses.

The operation of my dewatering device is relatively simple, and it is adaptable to a wide variety of kinds and consistencies of pulp. The adaptations, which will vary, as the nature of the pulp varies, will readily occur to those skilled in the art. For example, the size and shape of the apertures in the foraminous cylinder may be varied to suit coarse or fine, fibrous or globular pulps. The speed of rotation may be varied to suit the rate of drainage or freeness of the pulps and the degree of dewatering desired. The dimensions of the cylinder, both in diameter and length, may be varied to suit the desired capacity and general convenience of the overall installation. Moreover, the pitch of the spiral conveyor flights may be varied as desired as well as the inclination of the axis of rotation to the horizontal.

In the drawing, the rolls or ridges are shown as made up of the same material as the screen. In many adaptations of my invention this construction is preferred. However, the particular shape and substance of these rolls may vary widely. In cross-section, they may be portions of a circle or ellipse. They may be triangular, or they may be merely shelves attached more or less rigidly to the screen. They are preferably made of foraminous material in order to facilitate the dewatering action. In any event, their form and substance should be such that the normal rolling path of the wet pith as it is carried up the rising side of the rotating screen is increased in length.

The foregoing description of my novel apparatus provides a device whereby an aqueous fluid pulp is dewatered sufficiently to transform the substance of the pulp to that of a solid, non-fluid material. Once this character of substance is obtained, the pulp may then be further dewatered, as desired, by passing the wet material between rolls or through other pressing devices to squeeze out liquid. Still further dewatering or drying may be accomplished by known methods.

My method of partial dewatering fluid pulps so as to transform them to a generally solid character is not limited to the use of the novel class of apparatus disclosed herein, however. Broadly, it involves the inducement of accretive processes in fluid pulps which are characterized by a general cohesiveness when partially dewatered. This is accomplished by providing a nuclear mass of partially dewatered pulp possessing the characteristics of a solid in an environment of fluid pulp disposed in a relatively thin film while removing water from the system. Simultaneously, I cause the nuclear mass to move in contact with the film, whereby it agglomerates pulp from the film upon itself, and increasing the extent and rate of agglomeration by employing a film surface of generally undulating character whereby the pulp substance agglomerated is transformed from fluid to solid character more effectively and efficiently.

The process is conveniently carried out in the novel foraminous cylinder previously described. It may also be carried out a number of additional ways, however, as for example, by disposing the film of wet pulp on a screen belt which travels in an undulating path.

I claim:

1. The method comprising providing a nuclear mass of partially dewatered pulp possessing the characteristics of a solid in contact with a relatively thin film of pulp, said film containing sufficient water to possess the characteristics of a fluid while removing water from the system, said film being of a generally undulant character, simultaneously causing the nuclear mass to move in contact with the film whereby the motion conforms to the undulant character of the film and whereby the mass agglomerates pulp from the film upon itself, said agglomerated pulp being thereby transferred from fluid to solid character, and recovering said agglomerated mass of pulp.

2. The process of partially dewatering an aqueous pulp comprising pith particles suspended in an aqueous medium, comprising providing a nuclear mass of partially dewatered pith, said mass possessing the characteristics of a solid substance, in contact with a relatively thin film of aqueous pulp composed of pith particles and water, said film forming a surface of generally undulant character, removing water from the system and simultaneously causing the nuclear mass to move in contact with the film in a path conforming to the undulant surface whereby the mass agglomerates pith from the film upon itself thereby transforming the agglomerated pith from fluid to solid character, and recovering said agglomerated mass of pulp.

3. The method comprising providing a nuclear mass of partially dewatered bagasse pith, said mass possessing the characteristics of a solid substance, in contact with a film of pulp composed of bagasse pith particles and water, removing water from the system and simultaneously causing the nuclear mass to move in contact with the film in a cycle of rising and rolling motion whereby the mass agglomerates pith particles upon itself, thereby transforming the agglomerated pith particles from fluid to solid character, and recovering said agglomerated mass of pulp.

References Cited in the file of this patent

UNITED STATES PATENTS

| | | |
|---|---|---|
| 1,173,748 | Shartle | Feb. 29, 1916 |
| 2,047,808 | Trimbey | July 14, 1936 |
| 2,064,024 | McIntyre et al. | Dec. 15, 1936 |
| 2,331,455 | Cowles | Oct. 12, 1943 |
| 2,355,091 | McDonald | Aug. 8, 1944 |
| 2,463,814 | Skinner | Mar. 8, 1949 |
| 2,563,249 | Koziol | Aug. 7, 1951 |